US009845866B2

United States Patent
Drees et al.

(10) Patent No.: US 9,845,866 B2
(45) Date of Patent: Dec. 19, 2017

(54) DEVICE AND METHOD FOR SELECTIVELY OPERATING A MOTOR VEHICLE IN A USER-CONTROLLED OR AN AUTOMATIC DRIVING OPERATION MODE

(71) Applicant: Leopold Kostal GmbH & Co. KG, Luedenscheid (DE)

(72) Inventors: Roland Drees, Boenen (DE); Mario Janetzko, Dortmund (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 27 days.

(21) Appl. No.: 14/962,420

(22) Filed: Dec. 8, 2015

(65) Prior Publication Data

US 2016/0091083 A1    Mar. 31, 2016

Related U.S. Application Data

(63) Continuation of application No. PCT/EP2014/063185, filed on Jun. 23, 2014.

(30) Foreign Application Priority Data

Jun. 25, 2013    (DE) ........................ 10 2013 010 630

(51) Int. Cl.
     *F16H 59/02*      (2006.01)
     *B60K 28/06*      (2006.01)
     (Continued)

(52) U.S. Cl.
     CPC ......... *F16H 59/0204* (2013.01); *B60K 28/06* (2013.01); *B60L 15/10* (2013.01);
     (Continued)

(58) Field of Classification Search
     CPC . B60K 28/06; F16H 59/0204; F16H 59/0217; G05D 1/0061; B60L 15/10; B60W 30/182
     See application file for complete search history.

(56) References Cited

U.S. PATENT DOCUMENTS

| 8,260,482 B1 * | 9/2012 | Szybalski | .............. B62D 1/286 701/23 |
| 8,352,110 B1 * | 1/2013 | Szybalski | .............. B62D 1/286 701/23 |

(Continued)

FOREIGN PATENT DOCUMENTS

| DE | 102008040149 A1 | 1/2010 |
| DE | 102009045760 A1 | 4/2010 |

(Continued)

OTHER PUBLICATIONS

European Patent Office, International Search Report for corresponding International Application No. PCT/EP2014/063185 dated Sep. 10, 2014.

(Continued)

*Primary Examiner* — Ramya Burgess
*Assistant Examiner* — Tinh Dang
(74) *Attorney, Agent, or Firm* — Brooks Kushman P.C.

(57) ABSTRACT

A system for a vehicle operable in a user-controlled driving mode and an automatic driving mode includes a hand-operated control element and a contact sensor configured to detect whether a driver of the vehicle is holding the control element. The system further includes a controller to monitor an alertness of the driver while the vehicle is in the automatic driving mode depending on whether the driver is holding the control element and/or switch operation of the vehicle between the user-controlled driving mode and the automatic driving mode depending on whether the driver is holding the control element.

15 Claims, 2 Drawing Sheets

(51) Int. Cl.
    *G05D 1/00*           (2006.01)
    *B60W 30/182*       (2012.01)
    *B60L 15/10*         (2006.01)
    *F16H 59/10*        (2006.01)

(52) U.S. Cl.
    CPC ....... B60W 30/182 (2013.01); F16H 59/0217 (2013.01); F16H 59/10 (2013.01); G05D 1/0061 (2013.01); *B60L 2250/24* (2013.01); *B60L 2250/26* (2013.01); *B60L 2260/26* (2013.01); *B60W 2540/12* (2013.01); *B60W 2540/16* (2013.01); *B60W 2540/18* (2013.01); *G05D 2201/0213* (2013.01); *Y02T 10/645* (2013.01)

(56) References Cited

U.S. PATENT DOCUMENTS

| | | | | |
|---|---|---|---|---|
| 8,374,743 | B2 * | 2/2013 | Salinger | G05D 1/0246 701/23 |
| 8,493,199 | B2 * | 7/2013 | Koehler | B62D 15/0285 180/272 |
| 8,700,251 | B1 * | 4/2014 | Zhu | G05D 1/02 701/25 |
| 8,706,342 | B1 * | 4/2014 | Szybalski | B60W 50/14 382/106 |
| 8,798,841 | B1 * | 8/2014 | Nickolaou | B60K 31/0008 340/435 |
| 8,897,926 | B2 | 11/2014 | Staehlin et al. | |
| 9,348,334 | B2 * | 5/2016 | McGinn | G05D 1/0061 |
| 9,495,874 | B1 * | 11/2016 | Zhu | B60W 30/095 |
| 2003/0055538 | A1 | 3/2003 | Yanaka | |
| 2009/0287367 | A1 | 11/2009 | Salinger | |
| 2011/0148613 | A1 | 6/2011 | Koehler et al. | |
| 2011/0245992 | A1 | 10/2011 | Staehlin et al. | |
| 2012/0010485 | A1 * | 1/2012 | Couronne | A61B 5/14552 600/340 |
| 2012/0271500 | A1 | 10/2012 | Tsimhoni et al. | |
| 2013/0325151 | A1 | 12/2013 | Wadia | |
| 2014/0305715 | A1 | 10/2014 | Makino et al. | |

FOREIGN PATENT DOCUMENTS

| | | |
|---|---|---|
| DE | 102012205343 A1 | 10/2012 |
| DE | 102011101709 A1 | 11/2012 |
| WO | 2012061141 A2 | 5/2012 |
| WO | 2013080886 A1 | 6/2013 |

OTHER PUBLICATIONS

The International Bureau of WIPO, International Preliminary Report on Patentability for International Application No. PCT/EP2014/063185 dated Dec. 29, 2015.

\* cited by examiner

DEVICE AND METHOD FOR SELECTIVELY OPERATING A MOTOR VEHICLE IN A USER-CONTROLLED OR AN AUTOMATIC DRIVING OPERATION MODE

CROSS-REFERENCE TO RELATED APPLICATIONS

This application is a continuation of International Application No. PCT/EP2014/063185, published in German, with an International filing date of Jun. 23, 2014, which claims priority to DE 10 2013 010 630.3, filed Jun. 25, 2013; the disclosures of which are hereby incorporated in their entirety by reference herein.

TECHNICAL FIELD

The present invention relates to selectively operating a vehicle in a user-controlled driving operation mode or in an automatic driving operation mode.

BACKGROUND

Automobiles of the future will increasingly offer the possibility of automatic driving. Automatic driving means that the vehicle takes over both transverse and longitudinal driving operations. In a first stage of development, which corresponds to a partial automatic driving mode, the driver of the vehicle is to continuously monitor the operations of the vehicle and be able to intervene in critical situations at all times. In order to assure this, systems have been proposed to switch between the automatic driving mode and a user-controlled driving mode and to monitor alertness of the driver during the automatic driving mode. Initially, the automatic driving mode will be used in specific driving situations, for example, driving on a freeway or during parking. Vehicles must therefore be driven manually (i.e., in the user-controlled driving mode) in many situations still. For this purpose, as in a conventional automatic vehicle, a steering wheel, an accelerator pedal, and a brake pedal continue to be provided for vehicles having an automatic driving mode.

DE 10 2008 040 149 A1 (corresponds to U.S. Pat. No. 8,493,199) describes a system for releasing the automatic driving of a vehicle in which cameras arranged within the vehicle monitor the alertness of the driver during an automatic driving mode.

SUMMARY

An object includes monitoring the alertness of the driver of a vehicle with relatively little effort while the vehicle is in an automatic driving mode and assuring a selectively controlled switching between the automatic driving mode and a user-controlled driving mode of the vehicle.

In carrying out at least one of the above and/or other objects, a system for a vehicle operable in a user-controlled driving mode and an automatic driving mode includes a hand-operated control element and a contact sensor. The contact sensor is configured to detect whether a driver of the vehicle is holding the control element. The controller is in communication with the contact sensor and configured to monitor an alertness of the driver while the vehicle is in the automatic driving mode depending on whether the driver is holding the control element, wherein the controller deems the driver to be alert when the driver is holding the control element while the vehicle is in the automatic driving mode.

The controller may be further configured to switch operation of the vehicle between the user-controlled driving mode and the automatic driving mode depending on whether the driver is holding the control element. In this case, the controller may be further configured to switch operation of the vehicle from the automatic driving mode to the user-controlled driving mode upon the driver releasing the control element after having held the control element and/or switch operation of the vehicle from the user-controlled driving mode to the automatic driving mode upon the driver holding the control element after having not held the control element.

The control element may be configured to enable the driver to move the control element to input commands for longitudinal and transverse guidance of the vehicle while the vehicle is in the automatic driving mode.

In an embodiment, the control element is a drive stick and the system further includes a steering wheel sensor configured to detect whether the driver is holding the steering wheel. In this case, the controller is further configured to switch operation of the vehicle between the user-controlled driving mode and the automatic driving mode depending on whether the driver is holding the drive stick and on whether the driver is holding the steering wheel. The controller may switch operation of the vehicle to the user-controlled driving mode while the driver is holding the steering wheel and is not holding the drive stick. The controller may switch operation of the vehicle to the automatic driving mode while the driver is holding the drive stick and is not holding the steering wheel.

Further, in carrying out at least one of the above and/or other objects, a method for a vehicle operable in a user-controlled driving mode and an automatic driving mode is provided. The method includes detecting whether a driver of the vehicle is holding a hand-operated control element provided in the vehicle. The method further includes monitoring an alertness of the driver while the vehicle is in the automatic driving mode depending on whether the driver is holding the control element and deeming the driver to be alert when the driver is holding the control element while the vehicle is in the automatic driving mode.

The method may further include switching operation of the vehicle between the user-controlled driving mode and the automatic driving mode depending on whether the driver is holding the control element. In this case, the method may further include switching operation of the vehicle from the automatic driving mode to the user-controlled driving mode upon the driver releasing the control element after having held the control element and/or switching operation of the vehicle from the user-controlled driving mode to the automatic driving mode upon the driver holding the control element after having not held the control element.

The method may further include the driver moving the control element to input commands for longitudinal and transverse guidance of the vehicle while the vehicle is in the automatic driving mode.

In an embodiment, the control element is a drive stick and the method further includes detecting whether the driver is holding a steering wheel of the vehicle and switching operation of the vehicle between the user-controlled driving mode and the automatic driving mode depending on whether the driver is holding the drive stick and on whether the driver is holding the steering wheel. The operation of the vehicle may be switched to the user-controlled driving mode while the driver is holding the steering wheel and is not holding the drive stick and/or the operation of the vehicle may be switched to the automatic driving mode while the driver is holding the drive stick and is not holding the steering wheel. The operation of the vehicle is switched to the manual driving mode upon the driver rotating the steering wheel.

Also, in carrying out at least one of the above and/or other objects, a system for a vehicle operable in a user-controlled driving mode and an automatic driving mode is provided. The system includes a hand-operated control element having a contact sensor. The contact sensor is configured to detect whether a driver of the vehicle is holding the control element. The system further includes a controller in communication with the contact sensor and configured to switch operation of the vehicle between the user-controlled driving mode and the automatic driving mode depending on whether the driver is holding the control element.

The controller may be further configured to monitor an alertness of the driver while the vehicle is in the automatic driving mode depending on whether the driver is holding the control element, wherein the controller deems the driver to be alert when the driver is holding the control element while the vehicle is in the automatic driving mode.

An embodiment provides a device and a method for selectively operating a vehicle in a user-controlled driving mode or in an (at least partial) automatic driving mode. The device and the method ensure with relatively reduced effort an effective monitoring of the driver's attention during the automatic driving mode and a specifically controlled changeover between the user-controlled and automatic driving modes. The device and the method make use of a controller and a manually operable control element having a tactile sensor. The control element is configured to enable the driver to move the control element to input commands for longitudinal and/or transverse guidance of the vehicle while the vehicle is in the automatic driving mode. The sensor is configured to generate a signal indicative of whether a user (e.g., the driver) is touching the control element. The controller uses the sensor signal to monitor the attention of the driver during the automatic driving mode. The controller deems the driver to be attentive during the automatic driving mode depending on whether the driver is touching the control element. That is, the driver is to convey that the driver is being attentive to the vehicle operation during the automatic driving mode by touching the control element while the vehicle is in the automatic driving mode. The controller further uses the sensor signal to determine when to switch between the user-controlled and automatic driving modes. That is, the controller switches between the user-controlled and automatic driving modes depending on whether the driver releases the control element after touching the control element, the driver touches the control element after having not touched the control element, etc.

In an embodiment, a device for monitoring the alertness of the driver of a vehicle while the vehicle is in an automatic driving mode and for assuring a deliberately controlled switching between the automatic driving mode and a user-controlled (i.e., driver-controlled) driving mode of the vehicle is provided. The device achieves the functions of monitoring the alertness of the driver during the automatic driving mode and of controlled switching between the user-controlled and automatic driving modes via the presence of an additionally provided hand-operated control element (e.g., an additionally provided drive stick manually operable by the driver) in conjunction with a controller. The drive stick is associated with the automatic driving mode as the driver may use the drive stick to input commands for longitudinal and/or transverse guidance of the vehicle while the vehicle is in the automatic driving mode. The drive stick has a contact sensor configured to generate a signal indicative of whether the driver is touching the drive stick. The contact sensor signal is associated with implementing the switching between the user-controlled and automatic driving modes and for monitoring the alertness of the driver. In particular, the controller uses the contact sensor signal to monitor the alertness of the driver while the vehicle is in the automatic driving mode and to switch between the user-controlled and automatic driving modes.

In an embodiment, a method for monitoring the alertness of the driver of a vehicle while the vehicle is in an automatic driving mode and for assuring a deliberately controlled switching between the automatic driving mode and a user-controlled driving mode of the vehicle is provided. The method achieves these functions via the presence of the additionally provided drive stick in conjunction with a controller. The method may include the driver using the drive stick to input commands for longitudinal and/or transverse motions of the vehicle during an automatic driving mode of the vehicle. The method includes monitoring the alertness of the driver and/or switching between the automatic driving mode and the user-controlled driving mode by evaluating the contact sensor signal indicative of whether or not the driver is touching the drive stick.

The additionally provided hand-operated control element (i.e., the additionally provided drive stick manually operable by the driver) is associated with the automatic driving mode and enables the driver to take control of the behavior of the vehicle, particularly during automatic driving operation. Through this additional control element, which is for example implemented as a type of "drive stick" located in the center console of the vehicle, designed like a "joy stick" which is familiar as a type of computer control element, the driver can thereby communicate the driving maneuver the driver wishes to undertake while the vehicle is in the automatic driving mode. Possible maneuvers are, for example, "drive faster", "drive slower", "change lanes", or "parallel park."

In an embodiment, a steering wheel of the vehicle is equipped with a tactile (i.e., contact) sensor. The steering wheel sensor is configured to generate a signal indicative of whether the driver is touching the steering wheel. The steering wheel sensor signal is associated with the controller implementing the switching between the user-controlled and automatic driving modes and/or monitoring the alertness of the driver during the automatic driving mode.

The switchover process from manual to automatic driving (i.e., from the user-controlled driving mode to the automatic driving mode) and restitution of the driving task from the automatic driving mode to the driver (i.e., from the automatic driving mode to the user-controlled driving mode) represent an essential aspect when driving a vehicle with a (partially-) automated driving function. These switchovers usually occur while the vehicle is moving and can be initiated both by the driver and by the vehicle.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
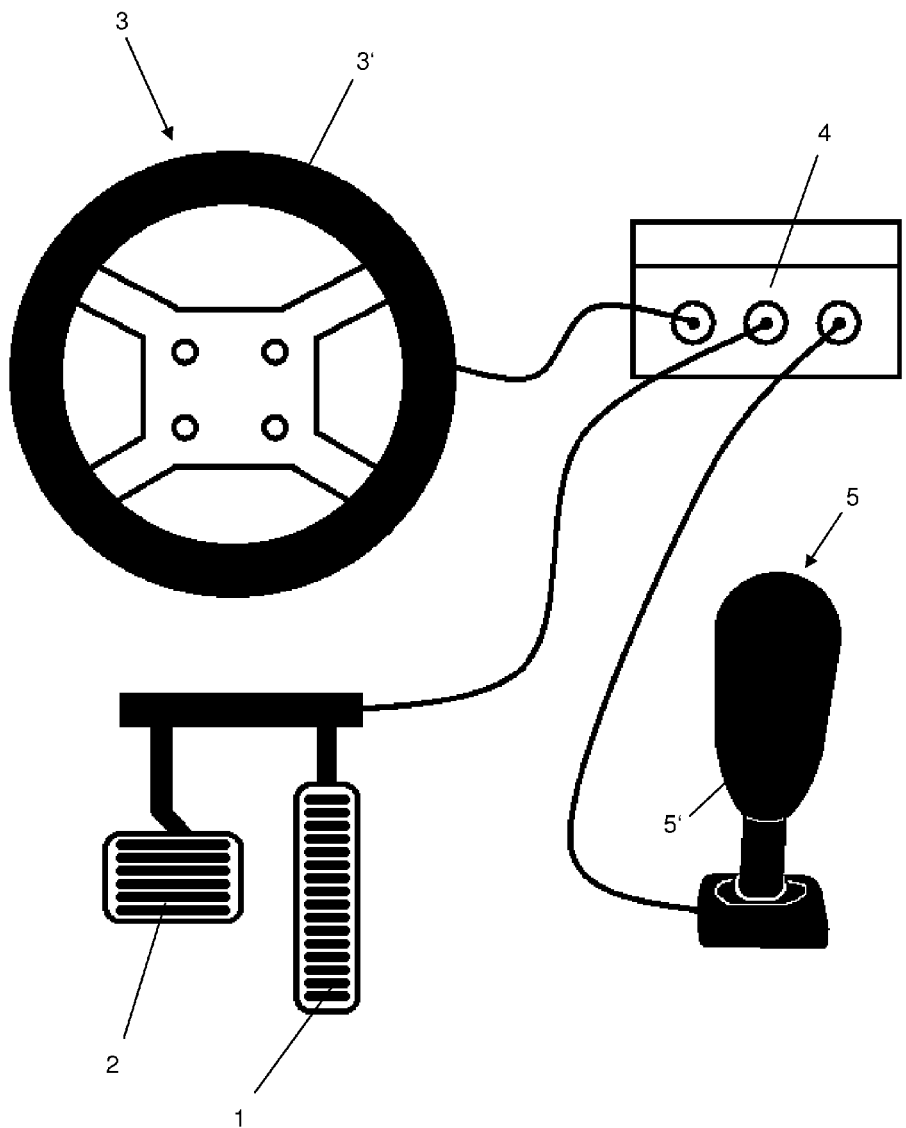
FIG. 1 illustrates a schematic diagram of a system for selectively operating a vehicle in a user-controlled driving mode or in an automatic driving mode.

Referring now to FIG. 1, a system for selectively operating a vehicle in a user-controlled ("driver-controlled") driving mode or in an (at least partial) automatic driving mode is shown.

In the conventional manner, input interfaces for the user-controlled driving mode include an accelerator pedal (or "gas pedal") 1, a brake pedal 2 for longitudinal stopping control of the vehicle, and a steering wheel 3 for transverse control of the vehicle. In the conventional manner, the driver of the vehicle uses accelerator pedal 1, brake pedal 2, and steering wheel 3 to drive the vehicle while the vehicle is in the user-controlled driving mode.

The system includes a device ("controller") 4 and a hand-operated control element 5. Controller 4 is for switching from the user-controlled driving mode to the automatic driving mode, for switching from the automatic driving mode to the user-controlled driving mode, and for monitoring the alertness of the driver during the automatic driving mode. Control element 5 is manually operable by the driver. Control element 5 may be a component in addition to other manually operable control elements in the vehicle. For instance, control element 5 is formed by a "drive stick." Drive stick 5 may be in the center console of the vehicle and thus located in a position at which a conventional shift lever for the vehicle is normally mounted.

Drive stick 5 is associated with the automatic driving mode. The driver may manually manipulate drive stick 5 to transmit commands to the vehicle for controlling longitudinal and transverse driving operations of the vehicle while the vehicle is in the automatic driving mode. For example, drive stick 5 is functionally designed in the known manner of a joystick. Thus, the driver can manipulate drive stick 5 using intuitive motions parallel or perpendicular to the longitudinal axis of the vehicle to transmit commands to the vehicle for longitudinal and transverse driving operations.

Drive stick 5 includes a tactile (or contact) sensor 5' ("drive stick sensor 5'"). Drive stick sensor 5' is configured to generate a signal indicative of whether drive stick 5 is being held (e.g., touched, handled, gripped, grasped, etc.) by the driver (regardless of whether the driver is actually moving the drive stick). Controller 4 is in communication with drive stick sensor 5' to receive the drive stick sensor signal indicative of whether the driver is holding drive stick 5.

Controller 4 uses the drive stick sensor signal to monitor the attention of the driver during the automatic driving mode. Controller 4 deems the driver to be attentive during the automatic driving mode depending on whether the driver is holding drive stick 5. Controller 4 further uses the drive stick sensor signal to determine when to switch between the user-controlled and automatic driving modes. Controller 4 generally switches the vehicle between the user-controlled and automatic driving modes depending on whether the driver releases or holds drive stick 5 after respectively holding or not having held the drive stick.

Drive stick sensor 5', for instance, is located directly under the outer skin of drive stick 5 as a capacitive sensor, and whose output signal is transmitted to controller 4. Drive stick sensor 5' thereby enables drive stick 5 to cooperate with controller 4 for switching between the user-controlled and automatic driving modes and for monitoring the alertness of the driver during the automatic driving mode.

In the embodiment shown in FIG. 1, steering wheel 3 includes a tactile sensor 3' ("steering wheel sensor 3'"). Steering wheel sensor 3' is integrated into steering wheel 3 like drive stick sensor 5' is integrated into drive stick 5'. Steering wheel sensor 3' is configured to generate a signal indicative of whether steering wheel 3 is being held (e.g., touched, handled, gripped, grasped, etc.) by the driver (without the driver necessarily rotating the steering wheel) and/or is being rotated by the driver.

Controller 4 is in communication with steering wheel sensor 3' to receive the steering wheel sensor signal indicative of whether the driver is holding and/or rotating steering wheel 3. Steering wheel sensor 3' thereby enables steering wheel 3 to also cooperate with controller 4 for switching between the user-controlled and automatic driving modes and for monitoring the alertness of the driver during the automatic driving mode. For instance, controller 4 further uses the steering wheel sensor signal to determine when to switch between the user-controlled and automatic driving modes. Controller 4 generally switches the vehicle between the user-controlled and automatic driving modes depending on whether the driver releases or holds steering wheel 3 after respectively holding or not having held the steering wheel. As described below, controller 4 may switch the vehicle between the user-controlled and automatic driving modes depending on both of the drive stick sensor and the steering wheel sensor signal (i.e., depending generally on whether the driver is holding or not holding drive stick 5 and whether the driver is holding or not holding steering wheel 3).

Controller 4 may also be in communication with accelerator pedal 1 and/or brake pedal 2 as illustrated in FIG. 1.

Figure 2:
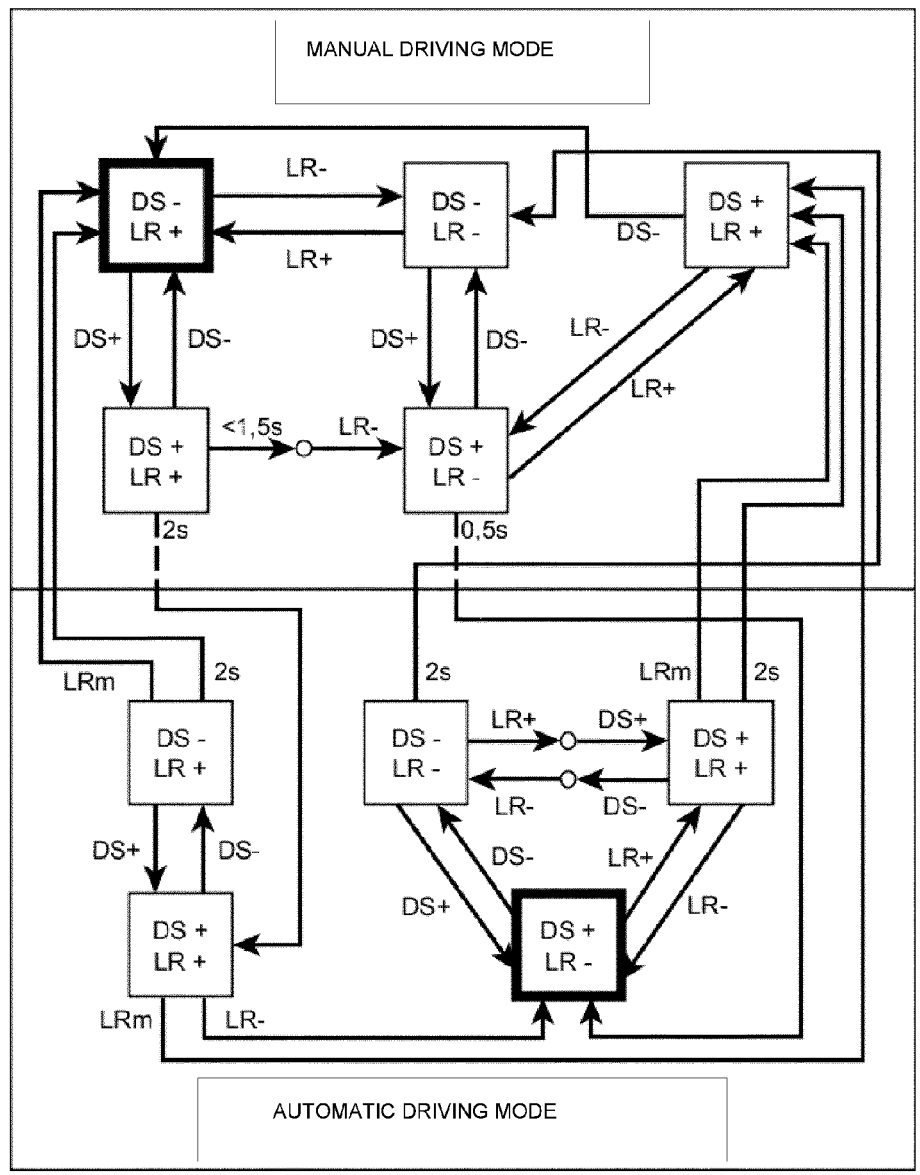
FIG. 2 illustrates a flowchart illustrating a method of operation of the system.

Referring now to FIG. 2, with continual reference to FIG. 1, a flowchart illustrating a method of operation of the system is shown. The following are abbreviations listed in the flowchart and their meanings:

DS+: drive stick 5 held
DS−: drive stick 5 released
LR+: steering wheel 3 held
LR−: steering wheel 3 released
LRm: steering wheel 3 rotated manually
x s: x seconds in this state For switching between a user-controlled and an (at least partial) automatic driving mode, also referred to as a manual driving mode and an automatic driving mode, respectively, drive stick sensor 5' detects whether the driver is holding drive stick 4 and/or steering wheel sensor 3 detects whether the driver is holding steering wheel 3.

Drive stick sensor 5' and steering wheel sensor 3' are tactile or contact sensors. A capacitive sensor located directly in drive stick 5 can be used as drive stick sensor 5'. Similarly, a capacitive sensor located directly in steering wheel 3 can be used as steering wheel sensor 3'. Optical or piezoelectric sensors, for example, can be used to implement drive stick sensor 5' and/or steering wheel sensor 3'.

An underlying principle of the operating philosophy and security strategy on which the method of operation of the system is based is as follows. The vehicle is in the automatic driving mode as long as the driver holds drive stick 5 in the driver's hand (DS+) and is not holding steering wheel 3 (LR−). The driving mode of the vehicle is to switch from the automatic driving mode to the manual driving mode upon either the driver now releasing (i.e., not holding) drive stick 5 (DS−) or holding steering wheel 3 (LS+). By continuously touching drive stick 5 during the automatic driving mode, the driver remains in the loop and thereby confirms at all times that the driver is monitoring the automatically driven vehicle and that the automatic system is performing correctly.

Thus, there are two standard situations. The first standard situation involves the vehicle operating in the manual driving mode. The vehicle operates in the manual driving mode while the driver is holding steering wheel 3 (LR+) and is not holding drive stick 5 (DS−). In the manual driving mode, the driver uses accelerator pedal 1, brake pedal 2, and steering wheel 3 to drive the vehicle manually. The second standard situation involves the vehicle operating in the automatic driving mode. The vehicle operates in the automatic driving mode while the driver is holding drive stick 5 (DS+) and is not holding steering wheel 3 (LR−). In the automatic driving mode, the vehicle drives (partially) automatically with the driver being able to use drive stick 3 to input commands for longitudinal and/or transverse guidance of the vehicle while the vehicle is in the automatic driving mode.

The first standard situation involving the vehicle operating in the manual driving mode is indicated in the flowchart of FIG. 2 by the block labeled with DS−/LR+. The second standard situation involving the vehicle operating in the automatic driving mode is indicated in the flowchart of FIG. 2 by the block labeled DS+/LR−. These two blocks represent the stable states of the system and are indicated as such in FIG. 2 with the bold outline.

Starting from either the stable manual driving mode state (DS−/LR+) or the stable automatic driving mode state (DS+/LR−), switching between the manual driving mode and the automatic driving mode can be made by releasing or holding drive stick 5 and/or steering wheel 3. The driver can also overrule the automatic driving mode and thereby immediately return to the manual driving mode by active intervention with steering wheel 3 (LRm). That is, the driver can switch from the automatic driving mode to the manual driving mode by executing a steering motion of steering wheel 3 (LRm).

As depicted in the flowchart shown in FIG. 2, transition from the manual driving mode to the automatic driving mode may occur as follows. Initially, the vehicle is in the manual driving mode according to the stable state in which the driver is touching steering wheel 3 (LR+) and is not touching drive stick 5 (DS−) (i.e., the stable manual driving mode state (DS−/LR+)). A switch to the automatic driving mode occurs by the driver now holding drive stick 5 (DS+) for at least two seconds. Also, a switch to the automatic driving mode occurs by the driver now holding drive stick 5 (DS+) for at least 0.5 seconds after releasing steering wheel 3 (LR−). The automatic driving mode is maintained as long as the driver does not release drive stick (DS−) or hold steering wheel 3 (LR+) after having released the steering wheel.

As further depicted in the flowchart shown in FIG. 2, transition from the automatic driving mode to the manual driving mode may occur as follows. Initially, the vehicle is in the automatic driving mode according to the stable state in which the driver is holding drive stick 5 (DS+) and is not holding steering wheel 3 (LR−). A switch to the manual driving mode occurs by the driver now releasing drive stick 5 (DS−) for at least two seconds. Also, a switch to the manual driving mode occurs by the driver now holding steering wheel 3 (LR+) for at least two seconds (the driver having not released drive stick 5 (DS−) in this case). Should the driver not touch steering wheel 3 after a switch from the automatic driving mode to the manual driving mode has been made, an appropriate warning is triggered by an indicator device.

The automatic driving mode is activated only under the conditions just described when the appropriate routines are designated for the actual current driving situation. Examples of such driving situations include freeway driving, driving in a line of traffic, or parking.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for a vehicle operable in a user-controlled driving mode and an automatic driving mode, the system comprising:
   a control element other than a steering wheel, the control element having a contact sensor, the contact sensor configured to detect whether a driver of the vehicle is holding the control element;
   a controller in communication with the contact sensor and configured to switch operation of the vehicle from the user-controlled driving mode to the automatic driving mode upon the driver holding the control element after having not held the control element and to switch operation of the vehicle from the automatic driving mode to the user-controlled driving mode upon the driver releasing the control element after having held the control element;
   wherein: the control element is a drive stick;
   the system further including a steering wheel sensor configured to detect whether the driver is holding a steering wheel of the vehicle; and
   the controller is in communication with the steering wheel sensor and is further configured to switch operation of the vehicle between the user-controlled driving mode and the automatic driving mode depending on whether the driver is holding the drive stick and on whether the driver is holding the steering wheel.

2. The system of claim 1 wherein:
   the control element is configured to enable the driver to move the control element to input commands for longitudinal and transverse guidance of the vehicle while the vehicle is in the automatic driving mode.

3. The system of claim 1 wherein: the controller is further configured to switch operation of the vehicle to the user-controlled driving mode while the driver is holding the steering wheel and is not holding the drive stick.

4. The system of claim 3 wherein:
   the controller is further configured to switch operation from the user-controlled driving mode to the automatic driving mode upon the driver holding the drive stick for a predetermined period of time after not having held the drive stick.

5. The system of claim 1 wherein: the controller is further configured to switch operation of the vehicle to the automatic driving mode while the driver is holding the drive stick and is not holding the steering wheel.

6. The system of claim 5 wherein:
   the controller is further configured to switch operation of the vehicle from the automatic driving mode to the user-controlled driving mode upon the driver releasing the drive stick for a predetermined period of time after holding the drive stick.

7. The system of claim 1 wherein:
the controller is further configured to deem the driver to be alert when the driver is holding the control element while the vehicle is in the automatic driving mode.

8. A method for a vehicle operable in a user-controlled driving mode and an automatic driving mode, the method comprising:
detecting whether a driver of the vehicle is holding a control element provided in the vehicle, the control element being an element other than a steering wheel;
switching operation of the vehicle from the user-controlled driving mode to the automatic driving mode upon the driver holding the control element after having not held the control element;
switching operation of the vehicle from the automatic driving mode to the user-controlled driving mode upon the driver releasing the control element after having held the control element;
wherein: the control element is a drive stick; and
the method further including detecting whether the driver is holding a steering wheel of the vehicle and switching operation of the vehicle between the user-controlled driving mode and the automatic driving mode depending on whether the driver is holding the drive stick and on whether the driver is holding the steering wheel.

9. The method of claim 8 further comprising:
the driver moving the control element to input commands for longitudinal and transverse guidance of the vehicle while the vehicle is in the automatic driving mode.

10. The method of claim 8 further comprising: switching operation of the vehicle to the user-controlled driving mode while the driver is holding the steering wheel and is not holding the drive stick; and switching operation of the vehicle to the automatic driving mode while the driver is holding the drive stick and is not holding the steering wheel.

11. The method of claim 8 further comprising: switching operation of the vehicle to the user-controlled driving mode upon the driver rotating the steering wheel.

12. The method of claim 8 further comprising:
deeming the driver to be alert when the driver is holding the control element while the vehicle is in the automatic driving mode.

13. A system for a vehicle including a steering wheel and that is operable in (i) a user-controlled driving mode in which a driver of the vehicle handles the steering wheel to manually drive the vehicle and (ii) an automatic driving mode in which the vehicle drives automatically without the driver handling the steering wheel, the system comprising:
a control element other than the steering wheel, the control element having a contact sensor, the contact sensor configured to detect whether the driver of the vehicle is holding the control element; and
a controller in communication with the contact sensor and configured to switch operation of the vehicle from the user-controlled driving mode to the automatic driving mode upon the driver holding the control element after having not held the control element and to switch operation of the vehicle from the automatic driving mode to the user-controlled driving mode upon the driver releasing the control element after having held the control element.

14. The system of claim 13 wherein:
the controller is further configured to deem the driver to be alert when the driver is holding the control element while the vehicle is in the automatic driving mode.

15. The system of claim 13 wherein:
the control element is a drive stick.

* * * * *